US012795639B2

(12) United States Patent
Pezeshki et al.

(10) Patent No.: US 12,795,639 B2
(45) Date of Patent: Nov. 10, 2026

(54) SCHEDULING REQUEST ASSOCIATED WITH ARTIFICIAL INTELLIGENCE INFORMATION

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Taesang Yoo, San Diego, CA (US); Mahmoud Taherzadeh Boroujeni, San Diego, CA (US); Arumugam Chendamarai Kannan, San Diego, CA (US); Jingchao Bao, San Diego, CA (US); Ajay Gupta, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 207 days.

(21) Appl. No.: 16/949,916

(22) Filed: Nov. 20, 2020

(65) Prior Publication Data

US 2021/0185700 A1 Jun. 17, 2021

Related U.S. Application Data

(60) Provisional application No. 62/948,126, filed on Dec. 13, 2019.

(51) Int. Cl.

| | |
|---|---|
| ***H04W 72/12*** | (2023.01) |
| ***G06N 5/04*** | (2023.01) |
| ***G06N 20/00*** | (2019.01) |
| ***H04W 72/23*** | (2023.01) |

(52) U.S. Cl.
CPC .............. *H04W 72/12* (2013.01); *G06N 5/04* (2013.01); *G06N 20/00* (2019.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,588,146 | B2 | 3/2020 | Islam et al. | |
| 11,373,119 | B1 * | 6/2022 | Doshi | G06N 20/00 |
| 2014/0313908 | A1 * | 10/2014 | da Silva | H04W 72/042 370/252 |

(Continued)

FOREIGN PATENT DOCUMENTS

| | | | |
|---|---|---|---|
| EP | 3634052 | A1 | 4/2020 |
| KR | 20180095337 | A | 8/2018 |

(Continued)

OTHER PUBLICATIONS

International Search Report and Written Opinion—PCT/US2020/070812—ISA/EPO—Mar. 18, 2021.

*Primary Examiner* — Suk Jin Kang
(74) *Attorney, Agent, or Firm* — Harrity & Harrity, LLP

(57) ABSTRACT

Various aspects of the present disclosure generally relate to wireless communication. In some aspects, a user equipment may transmit a scheduling request that includes information associated with an artificial intelligence module of the user equipment, and receive an uplink grant for a resource allocation that is based at least in part on the artificial intelligence module. Numerous other aspects are provided.

25 Claims, 5 Drawing Sheets

(56) References Cited

U.S. PATENT DOCUMENTS

2015/0289287 A1* 10/2015 Larsson ............ H04W 72/1252
370/230
2016/0021646 A1* 1/2016 Hu ........................ H04W 52/28
370/329
2017/0010911 A1* 1/2017 Maji ................... G06F 9/45558
2017/0019914 A1* 1/2017 Rune ................. H04W 72/1284
2017/0359779 A1* 12/2017 Wang ...................... H04L 43/16
2018/0302918 A1* 10/2018 Shaheen ............... H04W 76/27
2019/0104174 A1* 4/2019 Li ........................... H04L 43/16
2019/0110308 A1* 4/2019 Yasukawa ......... H04W 72/1268
2019/0124594 A1* 4/2019 Wang ....................... H04J 11/00
2019/0277957 A1* 9/2019 Chandrasekhar ..... G01S 5/0246
2019/0324805 A1* 10/2019 Peng ...................... G06N 20/00
2019/0335448 A1* 10/2019 Yang ..................... H04W 72/51
2019/0357247 A1* 11/2019 Keskitalo .......... H04W 72/1284
2019/0373554 A1* 12/2019 Wang .................... H04W 72/14
2019/0385090 A1* 12/2019 Katole ..................... G06N 5/04
2020/0015206 A1* 1/2020 Lee ..................... H04W 72/042
2020/0022150 A1* 1/2020 Yu ......................... H04W 80/02
2020/0063315 A1* 2/2020 Yoon .................... G06K 9/6271
2020/0104777 A1* 4/2020 Bouhini ......... G06Q 10/063112
2020/0159559 A1* 5/2020 Maji ..................... G06F 9/5083
2020/0228169 A1* 7/2020 Tan ....................... H04W 16/14
2020/0229265 A1* 7/2020 Wang .................... H04W 24/08
2020/0257968 A1* 8/2020 Mitra ...................... H04L 67/51
2020/0329411 A1* 10/2020 Kong .................... H04W 72/23
2020/0348974 A1* 11/2020 Gupta ................... G06F 9/5083
2020/0359410 A1* 11/2020 Li ....................... H04W 72/569
2021/0007118 A1* 1/2021 Liu ................... H04W 72/1263
2021/0056436 A1* 2/2021 Shah ...................... G06N 20/00
2021/0076404 A1* 3/2021 Tsai .................. H04W 28/0278
2021/0357264 A1* 11/2021 Manchale Sridhar .......................
G06F 9/5061
2022/0022219 A1* 1/2022 Liu ....................... H04W 72/20
2022/0046698 A1* 2/2022 Zhao ..................... H04W 72/14
2022/0066829 A1* 3/2022 Pavagada Visweswara ................
G06F 9/5033
2022/0070722 A1* 3/2022 Wang ................ H04W 28/0289
2022/0124827 A1* 4/2022 Yang ..................... H04W 72/14
2022/0150872 A1* 5/2022 Park ...................... H04L 1/1896
2022/0159621 A1* 5/2022 Awad .................... H04W 72/14
2022/0174741 A1* 6/2022 Myung ............. H04W 74/0816
2023/0055213 A1* 2/2023 O'Shea ................. H04L 1/0033
2023/0342737 A1* 10/2023 Bull ....................... G06Q 20/10
2024/0063840 A1* 2/2024 Jung ...................... G06N 20/00
2025/0007988 A1* 1/2025 Letort ..................... H04L 67/10

FOREIGN PATENT DOCUMENTS

KR 20190103083 A 9/2019
KR 102030829 B1 10/2019
WO WO-2017176465 10/2017
WO 2018220772 A1 12/2018

* cited by examiner

SCHEDULING REQUEST ASSOCIATED WITH ARTIFICIAL INTELLIGENCE INFORMATION

CROSS-REFERENCE TO RELATED APPLICATION

This Patent Application claims priority to U.S. Provisional Patent Application No. 62/948,126, filed on Dec. 13, 2019, entitled "SCHEDULING REQUEST ASSOCIATED WITH ARTIFICIAL INTELLIGENCE INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a scheduling request (SR) associated with artificial intelligence (AI) information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a scheduling request that includes information associated with an artificial intelligence module of the UE; and receiving an uplink grant for a resource allocation that is based at least in part on the artificial intelligence module.

In some aspects, a method of wireless communication, performed by a base station, may include receiving a scheduling request that includes information associated with an artificial intelligence module associated with a UE; and transmitting, to the UE, an uplink grant for a resource allocation that is based at least in part on the artificial intelligence module.

In some aspects, a UE for wireless communication may include memory and one or more processors coupled to the memory. The memory and the one or more processors may be configured to transmit a scheduling request that includes information associated with an artificial intelligence module of the UE; and receive an uplink grant for a resource allocation that is based at least in part on the artificial intelligence module.

In some aspects, a base station for wireless communication may include memory and one or more processors coupled to the memory. The memory and the one or more processors may be configured to receive a scheduling request that includes information associated with an artificial intelligence module associated with a UE; and transmit, to the UE, an uplink grant for a resource allocation that is based at least in part on the artificial intelligence module.

In some aspects, a non-transitory computer-readable medium may store one or more instructions for wireless communication. The one or more instructions, when executed by one or more processors of a UE, may cause the one or more processors to: transmit a scheduling request that includes information associated with an artificial intelligence module of the UE; and receive an uplink grant for a resource allocation that is based at least in part on the artificial intelligence module.

In some aspects, a non-transitory computer-readable medium may store one or more instructions for wireless communication. The one or more instructions, when executed by one or more processors of a base station, may cause the one or more processors to: receive a scheduling request that includes information associated with an artificial intelligence module associated with a UE; and transmit, to the UE, an uplink grant for a resource allocation that is based at least in part on the artificial intelligence module.

In some aspects, an apparatus for wireless communication may include means for transmitting a scheduling request that includes information associated with an artificial intelligence module associated with the apparatus; and means for receiving an uplink grant for a resource allocation that is based at least in part on the artificial intelligence module.

In some aspects, an apparatus for wireless communication may include means for receiving a scheduling request that includes information associated with an artificial intelligence module associated with a UE; and means for transmitting, to the UE, an uplink grant for a resource allocation that is based at least in part on the artificial intelligence module.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
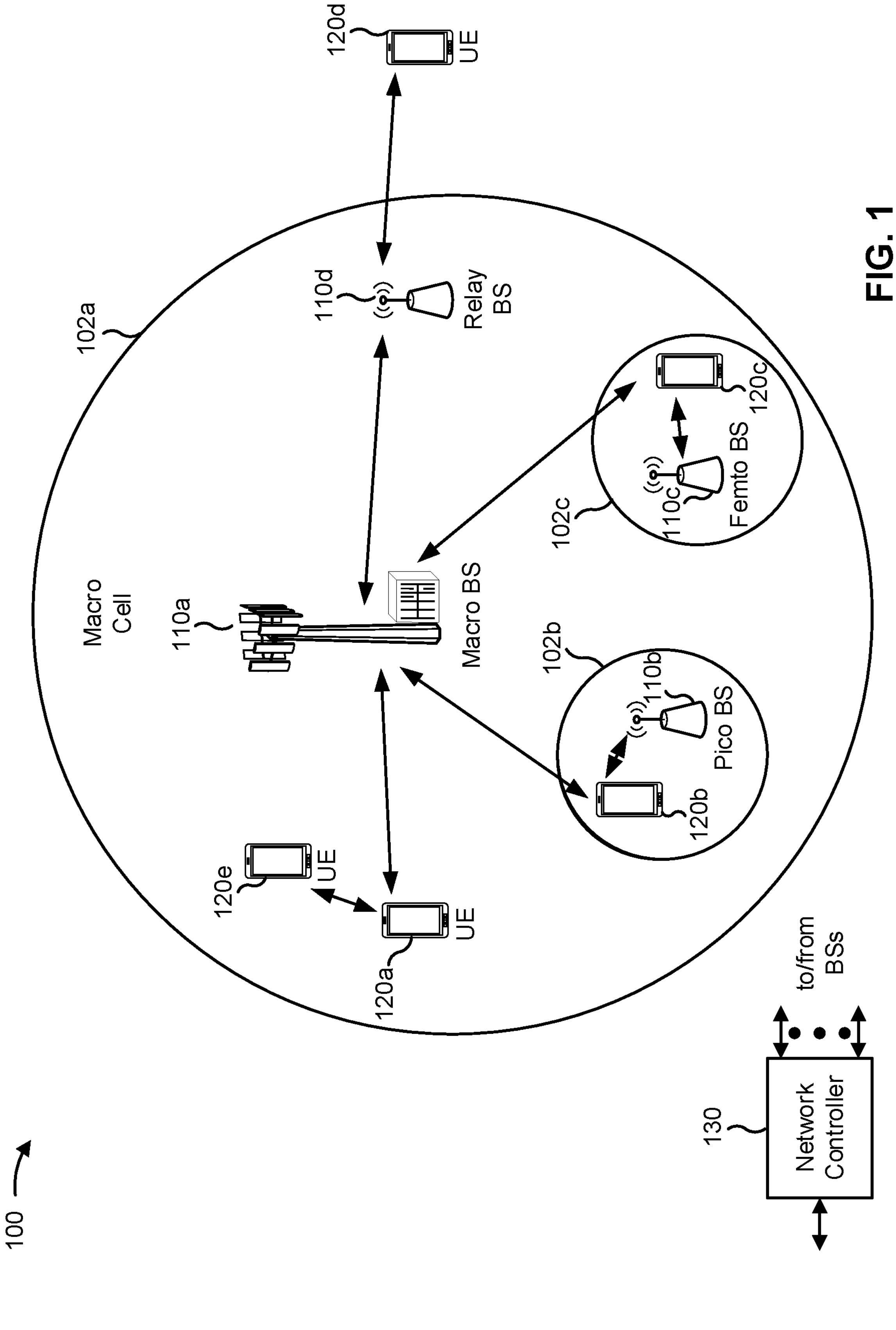
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
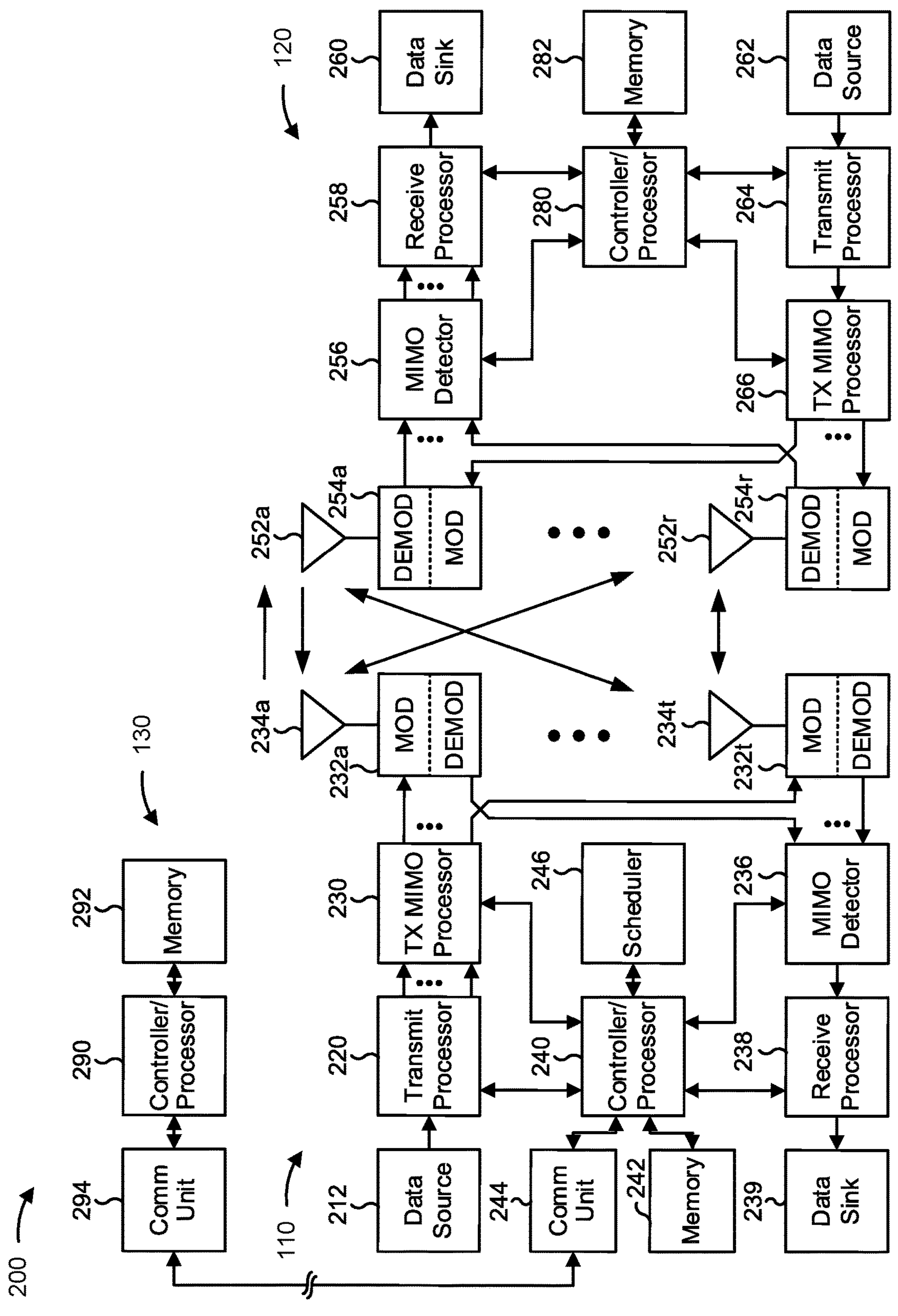
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a scheduling request for artificial intelligence (AI) information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for transmitting a scheduling request that includes information associated with an AI module of the UE; means for receiving an uplink grant for a resource allocation that is based at least in part on the AI module; means for performing the AI module; means for providing information determined using the AI module on the resource allocation; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a scheduling request that includes information associated with an AI module associated with a UE; means for transmitting, to the UE, an uplink grant for a resource allocation that is based at least in part on the AI module; means for determining a selected AI operation based at least in part on the AI module indicated by the scheduling request; means for performing the selected AI module; means for receiving information determined using the AI module on the resource allocation; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A scheduling request (SR) is a message transmitted from a UE to a base station that requests an uplink grant identifying resources for data transmission by the UE, such as via a physical uplink shared channel (PUSCH). An SR may be transmitted via a physical uplink control channel (PUCCH) or via an uplink control information (UCI) carried by a PUSCH. The uplink grant may be conveyed to the UE via downlink control information (DCI). Multiple SR resources can be configured, where each SR resource may be associated with a different logical channel. An SR resource is a resource configured for transmission of an SR. For example, a base station may expect to receive an SR on an SR resource, and not on a resource other than an SR.

A UE may perform an AI operation based at least in part on an AI module, such as to determine information to be provided to a base station. For example, some AI modules use neural networks (NNs) for an encoder, such as an autoencoder, to encode uplink communications of the UE. An encoder (e.g., the UE) may use an encoder network (e.g., a NN) to encode an input into an encoded message, and a decoder (e.g., a BS) may use a decoder network to decode the encoded message and approximately reconstruct the input. This is an example of a cross-node AI module (e.g., ML module, NN module), meaning that one part of the AI module (e.g., the encoder network) is located at one node (e.g., the UE) and another part of the AI module (e.g., the decoder network) is located at another node (e.g., the BS). Another example of an AI module is a standalone AI module. A standalone AI module may be located at a single node (e.g., a UE or a BS).

In some examples, an encoder network and a decoder network may be trained jointly. One advantage of this approach is that autoencoders may not require knowledge of the underlying data distribution of the input or an explicit identification of a structure of the input. One example of an application for an NN based encoder/decoder is channel state information (CSI) feedback in massive multiple input multiple output (MIMO) systems. Since CSI feedback in MIMO frequency division duplex (FDD) systems is typically associated with significant overhead and relates to sparse channels, significant compression gains can be realized using an NN based encoder/decoder.

In some aspects, a UE and a BS may use multiple different AI modules to communicate. For example, a UE and a BS may have multiple different AI modules with corresponding parameters (e.g., biases) and weights. Different AI modules with different parameters and weights may produce outputs (e.g., encoded messages and/or the like) of different sizes and may require corresponding decoder AI modules for decoding. As another example, a decoder may benefit from knowing the weights and parameters of an encoder, or may not be capable of performing decoding without knowing the weights and parameters of the encoder. Further, it may be beneficial for weights and parameters of a standalone AI module to be provided for use by other nodes that use the standalone AI module. Still further, different sets of weights or parameters may have different sizes, so a uniform size of resource allocation may not be efficient for providing different sets of weights or parameters.

Some techniques and apparatuses described herein provide indication of an AI module associated with an SR or information associated with the AI module. For example, the information associated with the AI module may include an index of the AI module or a weight or parameter associated with the AI module. The base station may determine a size or configuration of a resource allocation for an uplink grant associated with an SR based at least in part on the AI module indicated by the SR. In some aspects, the SR may indicate the AI module so that the base station can select an appropriately-sized resource allocation via which the UE can provide weights and parameters for the AI module to the base station. In some aspects, the base station may determine a selected AI module corresponding to the AI module (e.g., a decoding AI module associated with an encoding AI module). In some aspects, the SR may indicate weights or parameters for an AI module to the base station, so that the base station can reuse the weights or parameters with another UE, thereby conserving computing resources that would otherwise be used to train AI modules of the base station and the other UE. Furthermore, the base station can identify a resource allocation of an appropriate size to provide the weights or parameters to the other UE.

In this way, an AI module associated with an SR may be indicated using the SR. This may enable the base station to determine an appropriate resource allocation size or configuration for the resource allocation associated with the SR, thereby reducing overhead associated with wasted resource allocations or undersized resource allocations. Still further, the base station can reuse weights or parameters indicated by one UE's SR for another UE, thereby conserving computing resources that would otherwise be used to train encoding and decoding AI modules of the base station and the other UE.

Figure 3:
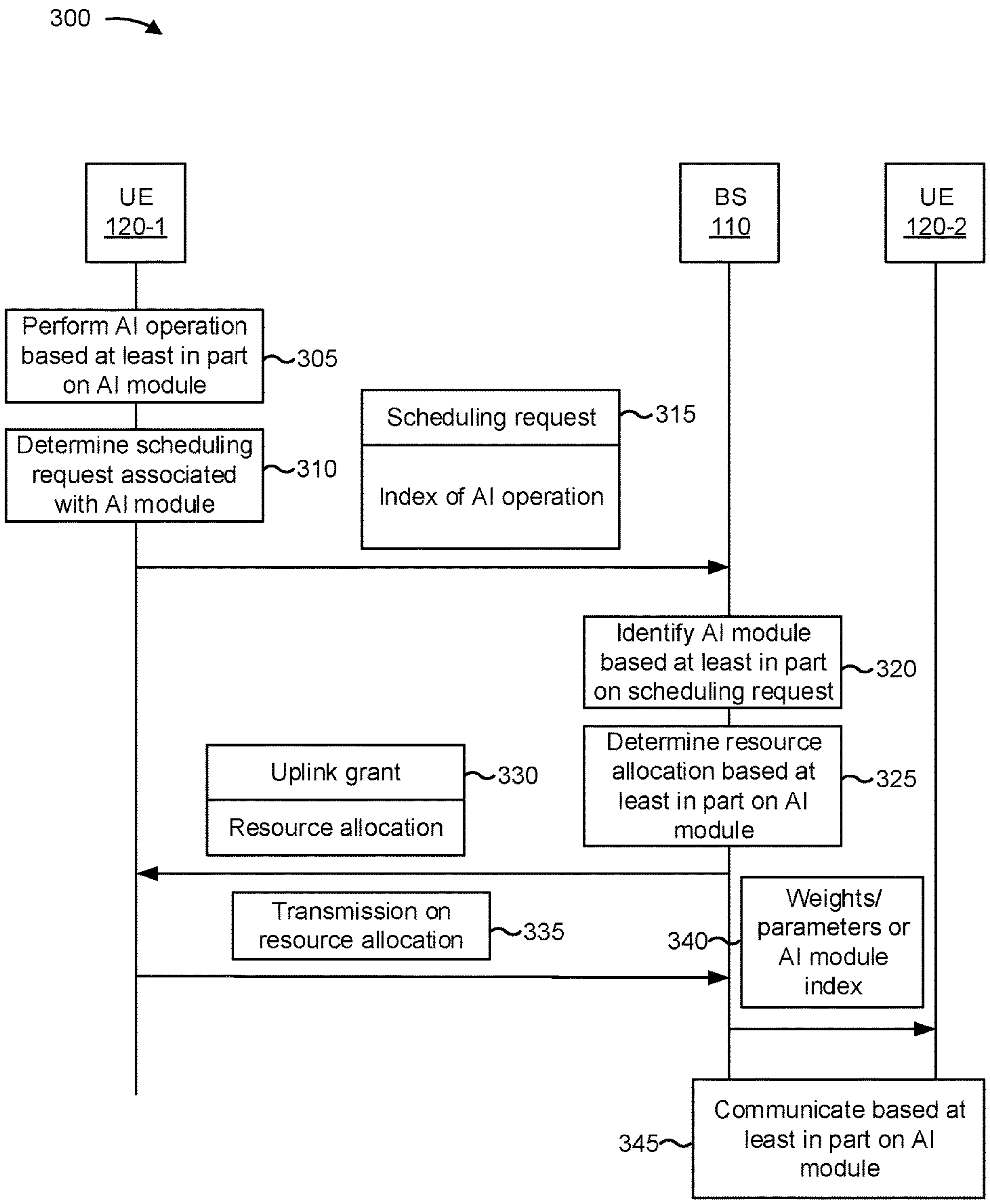
FIG. 3 is a diagram illustrating an example of scheduling an uplink communication associated with an AI module, in accordance with various aspects of the present disclosure.

FIG. 3 is a diagram illustrating an example 300 of scheduling an uplink communication associated with an AI module, in accordance with various aspects of the present disclosure. As shown, example 300 includes a UE 120-1, a UE 120-2, and a BS 110.

As shown in FIG. 3, and by reference number 305, the UE 120-1 may perform an AI operation based at least in part on an AI module (e.g., using antenna 252, DEMOD 254, MIMO detector 256, receive processor 258, controller/processor 280, and/or the like). In some aspects, the AI operation is to generate an encoded message, though the AI operation may be for any purpose. For example, the AI module may be an autoencoder AI module to generate an encoded message, such as CSI feedback for a massive MIMO configuration, though the encoded message may be associated with any sort of AI module. In some aspects, the encoded message may refer to any set of information that is generated by the AI module. It should be noted that the operation shown by reference number 305 is optional. For example, the UE 120 can perform the operations of example 300 without performing an AI operation and/or using an AI module (e.g., in order to provide weights or parameters associated with the AI module). The AI operation may be performed based at least in part on an AI module. For example, an AI module may indicate an input of the AI operation, one or more operations of the AI operation, weights and parameters associated with the AI operation, and/or the like.

The UE 120-1 may use particular weights and parameters for the AI module. For example, for a cross-node AI module, the UE 120-1 may use a particular configuration of an encoder NN to generate an encoded message, where a configuration is a set of weights and parameters. In this case, the UE 120-1 may select the particular configuration from a plurality of configurations of the encoder NN. In other words, the UE 120-1 may select the AI module from a plurality of AI modules associated with respective weights and/or parameters. In some aspects, the UE 120 may select the encoder NN from a plurality of encoder NNs associated with respective weights and/or parameters. In some aspects, the UE 120-1 and the BS 110 may train the encoder NN to determine the particular weights and parameters. Different encoder NNs may be associated with different sets of weights and parameters, which may have different sizes, for example, based at least in part on a size or configuration of the NN.

As shown by reference number 310, the UE 120-1 may determine an SR associated with the AI module (e.g., using controller/processor 280, transmit processor 264, TX MIMO processor 266, MOD 254, antenna 252, and/or the like). For example, the UE 120-1 may generate an SR that indicates the AI module. The SR may request a resource allocation on which to transmit information to the BS 110, such as information regarding an AI module used by the UE 120-1 (e.g., an index of the AI module), one or more weights or parameters used for the AI module, and/or the like. Additionally, or alternatively, the SR may indicate the information regarding the AI module and/or the one or more weights or parameters. In some aspects, the index of the AI module may be configured (e.g., preconfigured) or standardized. For example, the UE 120-1 may be configured with a plurality of AI modules or AI operations associated with corresponding identifiers or indices.

As shown by reference number 315, the UE 120-1 may transmit the SR (e.g., using controller/processor 280, transmit processor 264, TX MIMO processor 266, MOD 254, antenna 252, and/or the like). As further shown, the SR may indicate the AI module. In some aspects, the SR may indicate which AI module was used by the UE 120-1. For example, the SR may include or indicate an identifier (e.g., an index) corresponding to the AI module. In some aspects, the SR may indicate a set of weights or parameters associated with the AI module, which is described in more detail elsewhere herein. In some aspects, a resource used to transmit the SR may indicate the AI module. For example, the BS 110 may configure the UE 120 with SR resources that correspond to respective AI modules. The UE 120-1 may use an SR resource corresponding to the AI operation or AI module for the SR. In some aspects, a resource may correspond to two or more AI modules. In this case, a property of the SR may be used to differentiate the AI module indicated by the SR (e.g., a phase rotation of the SR and/or the like). In some aspects, the SR may include multiple bits that indicate the AI module or the set of weights or parameters. For example, a field of the PUCCH used for the SR may indicate the AI module or the set of weights or parameters. In some aspects, the SR may include or be associated with any form of AI-related information.

As shown by reference number 320, the BS 110 may identify the AI module based at least in part on the SR (e.g., using antenna 234, DEMOD 232, MIMO detector 236, receive processor 238, controller/processor 240, and/or the like). For example, the BS 110 may determine which AI module (e.g., a standalone AI module or a cross-node AI module) was used to generate the encoded message based at least in part on the SR. In some aspects, the BS 110 may identify the AI module based at least in part on which SR resource was used to transmit the SR. In some aspects, the BS 110 may identify the AI module based at least in part on a phase rotation or another property of the SR. In some aspects, the BS 110 may identify the AI module based at least in part on a parameter or weight identified by the SR and associated with the AI module.

In some aspects, the BS 110 may identify the AI module based at least in part on an explicit indication included in the SR. For example, the SR may include a field indicating AI-related information, such as an AI module, one or more weights or parameters associated with an AI module, or the like. One or more bits of the field may indicate the AI-related information. In some aspects, the field may be a field of a PUCCH or the like.

As shown by reference number 325, the BS 110 may determine a resource allocation based at least in part on the AI module (e.g., using controller/processor 240 and/or the like). For example, different AI modules may be associated with different sets of weights and/or parameters. The BS 110 may provide a resource allocation of a size corresponding to a set of weights and/or parameters of the AI module associated with the SR. For example, the size of the resource allocation may be sufficient for the UE 120 to transmit AI-related information associated with the AI module. In this way, the BS 110 may more efficiently communicate AI-related information with the UE 120-1, and may provide the weights and parameters to another UE 120-1 using an appropriately-sized downlink resource allocation.

As shown by reference number 330, the BS 110 may transmit the uplink grant indicating the resource allocation selected based at least in part on the AI module (e.g., using controller/processor 240, transmit processor 220, TX MIMO processor 230, MOD 232, antenna 234, and/or the like). As shown by reference number 335, the UE 120-1 may transmit a transmission using the uplink grant. For example, the UE 120 may transmit AI-related information, such as one or more weights or parameters for the AI module, or may transmit other information on the uplink grant (e.g., an encoded message and/or the like).

As shown by reference number 340, in some aspects, the BS 110 may provide the one or more weights or parameters and/or an AI module index to the UE 120-2 (e.g., using controller/processor 240, transmit processor 220, TX MIMO processor 230, MOD 232, antenna 234, and/or the like). The BS 110 may provide the one or more weights or parameters to the UE 120-2 using any form of signaling, such as downlink control information, radio resource control signaling, a medium access control control element, higher-layer signaling, and/or the like. In some aspects, the UE 120-2 may have a similar configuration as the UE 120-1. For example, the UE 120-1 and the UE 120-2 may have a same antenna configuration, may have a same processor, may be of a same make and/or model, and/or the like. In some aspects, the BS 110 may provide the one or more weights or parameters and/or the AI module index for the one or more weights and parameters to the UE 120-2 based at least in part on the UE 120-1 and the UE 120-2 having similar configurations. In some aspects, the BS 110 may provide weights or parameters for multiple different AI modules to the UE 120-2. By providing the weights or parameters for the AI module to the UE 120-2, the BS 110 enables the UE 120-2 to use the AI module (such as for a standalone AI operation) without jointly training a model used to perform the AI module, thereby conserving computing resources of the BS 110 and the UE 120-2.

In some aspects, the BS 110 and the UE 120-2 may train an AI module based at least in part on the weights, parameters, and/or AI module index. For example, the BS 110 and the UE 210-2 may use the weights and/or the parameters as initial values for training an AI module, corresponding to the AI module index, to perform the AI operation. In this way, the BS 110 and the UE 120 may conserve computing resources that would otherwise be used to train the AI module from scratch.

As shown by reference number 345, the BS 110 and the UE 120-2 may communicate based at least in part on the AI module. For example, the BS 110 and the UE 120-2 may perform one or more of the operations described in FIG. 3 using the weights and/or parameters of the AI module to perform the AI operation.

As indicated above, FIG. 3 is provided as an example. Other examples may differ from what is described with respect to FIG. 3.

Figure 4:
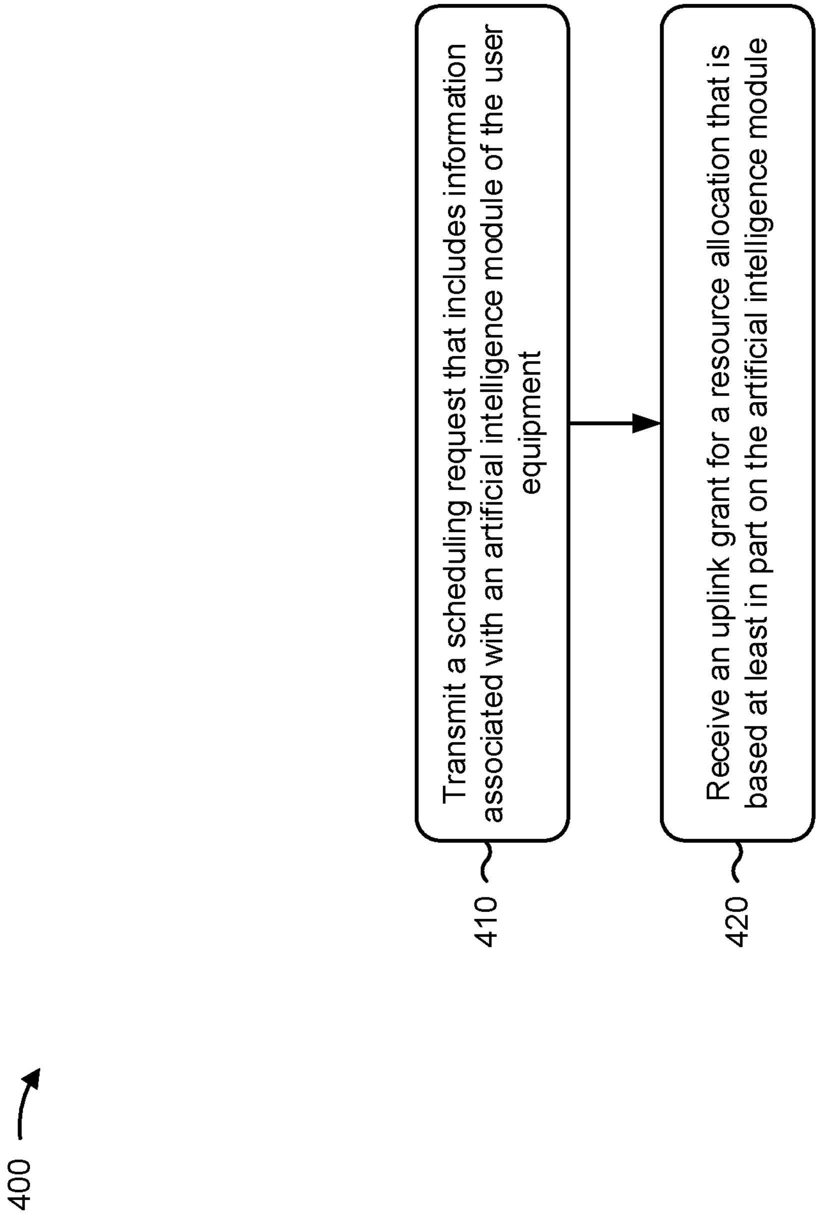
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with an SR for AI-related information.

As shown in FIG. 4, in some aspects, process 400 may include transmitting a scheduling request that includes information associated with an artificial intelligence module of the user equipment (block 410). For example, the UE (e.g., using controller/processor 280, transmit processor 264, TX MIMO processor 266, MOD 254, antenna 252, and/or the like) may transmit a scheduling request that includes information associated with an artificial intelligence module of the UE, as described above.

As further shown in FIG. 4, in some aspects, process 400 may include receiving an uplink grant for a resource allocation that is based at least in part on the artificial intelligence module (block 420). For example, the UE (e.g., using antenna 252, DEMOD 254, MIMO detector 256, receive processor 258, controller/processor 280, and/or the like) may receive an uplink grant for a resource allocation that is based at least in part on the artificial intelligence module, as described above.

Process 400 may include additional aspects, such as any single aspect or any combination of aspects described below and/or in connection with one or more other processes described elsewhere herein.

With respect to process 400, in a first aspect, the artificial intelligence module is one of a plurality of artificial intelligence modules that can be performed by the UE, and the artificial intelligence module is selected by the UE.

With respect to process 400, in a second aspect, alone or in combination with the first aspect, the artificial intelligence module comprises a channel state information feedback encoding operation.

With respect to process 400, in a third aspect, alone or in combination with one or more of the first and second aspects, the information indicating the artificial intelligence module indicates at least one of one or more weights or one or more parameters for the artificial intelligence module.

With respect to process 400, in a fourth aspect, alone or in combination with one or more of the first through third aspects, process 400 includes performing the artificial intelligence module, and providing at least one of one or more weights or one or more parameters using the resource allocation.

With respect to process 400, in a fifth aspect, alone or in combination with one or more of the first through fourth aspects, the artificial intelligence module is a preferred artificial intelligence module selected by the user equipment.

With respect to process 400, in a sixth aspect, alone or in combination with one or more of the first through fifth aspects, a size of the resource allocation or a configuration of the resource allocation is based at least in part on the information indicating the artificial intelligence module.

With respect to process 400, in a seventh aspect, alone or in combination with one or more of the first through sixth aspects, a phase of a transmission of the scheduling request indicates the information indicating the artificial intelligence module.

With respect to process 400, in an eighth aspect, alone or in combination with one or more of the first through seventh aspects, the information indicating the artificial intelligence module comprises one or more bits of the scheduling request.

With respect to process 400, in a ninth aspect, alone or in combination with one or more of the first through eighth aspects, the resource allocation is based at least in part on which scheduling request resource is used to transmit the scheduling request.

With respect to process 400, in a tenth aspect, alone or in combination with one or more of the first through ninth aspects, the scheduling request indicates the artificial intelligence module based at least in part on a scheduling request resource used to transmit the scheduling request.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
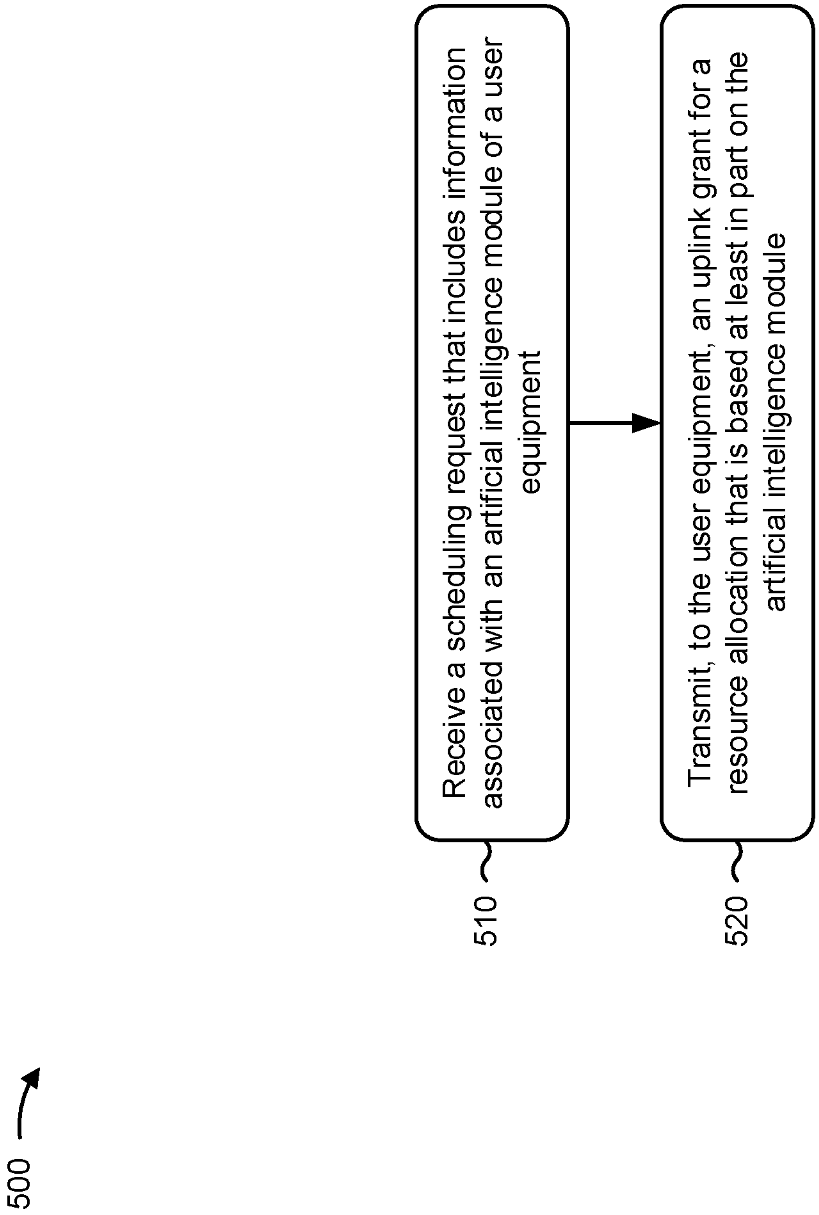
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., BS 110 and/or the like) performs operations associated with an SR associated with AI-related information.

As shown in FIG. 5, in some aspects, process 500 may include receiving a scheduling request that includes information associated with an artificial intelligence module of a user equipment (block 510). For example, the base station (e.g., using antenna 234, DEMOD 232, MIMO detector 236, receive processor 238, controller/processor 240, and/or the like) may receive a scheduling request that includes information associated with an artificial intelligence module of a user equipment, as described above.

As further shown in FIG. 5, in some aspects, process 500 may include transmitting, to the user equipment, an uplink grant for a resource allocation that is based at least in part on the artificial intelligence module (block 520). For example, the base station (e.g., using controller/processor 240, transmit processor 220, TX MIMO processor 230, MOD 232, antenna 234, and/or the like) may transmit, to the user equipment, an uplink grant for a resource allocation that is based at least in part on the artificial intelligence module, as described above.

Process 500 may include additional aspects, such as any single aspect or any combination of aspects described below and/or in connection with one or more other processes described elsewhere herein.

With respect to process 500, in a first aspect, process 500 includes determining a selected artificial intelligence module based at least in part on the artificial intelligence module indicated by the scheduling request, and performing the selected artificial intelligence module.

With respect to process 500, in a second aspect, alone or in combination with the first aspect, the artificial intelligence module indicated by the scheduling request comprises a channel state information feedback encoding operation, and the selected artificial intelligence module comprises a channel state information feedback decoding operation.

With respect to process 500, in a third aspect, alone or in combination with one or more of the first and second aspects, the artificial intelligence module is one of a plurality of artificial intelligence modules that can be performed by the user equipment, and the artificial intelligence module was selected by the user equipment.

With respect to process 500, in a fourth aspect, alone or in combination with one or more of the first through third aspects, the information indicating the artificial intelligence module indicates one or more weights or one or more parameters for the artificial intelligence module.

With respect to process 500, in a fifth aspect, alone or in combination with one or more of the first through fourth aspects, process 500 includes receiving information determined using the artificial intelligence module on the resource allocation.

With respect to process 500, in a sixth aspect, alone or in combination with one or more of the first through fifth aspects, the artificial intelligence module is a preferred artificial intelligence module that was selected by the user equipment.

With respect to process 500, in a seventh aspect, alone or in combination with one or more of the first through sixth aspects, a size of the resource allocation or a configuration of the resource allocation is based at least in part on the information indicating the artificial intelligence module.

With respect to process 500, in an eighth aspect, alone or in combination with one or more of the first through seventh aspects, a phase of a transmission of the scheduling request indicates the information indicating the artificial intelligence module.

With respect to process 500, in a ninth aspect, alone or in combination with one or more of the first through eighth aspects, the information indicating the artificial intelligence module comprises one or more bits of the scheduling request.

With respect to process 500, in a tenth aspect, alone or in combination with one or more of the first through ninth aspects, the process 500 further comprises providing information associated with the artificial intelligence module to another UE (e.g., UE 120-2).

With respect to process 500, in an eleventh aspect, alone or in combination with one or more of the first through tenth aspects, a size of a downlink resource allocation used to provide the information associated with the artificial intelligence module to the other UE is based at least in part on the information indicating the artificial intelligence module.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Implementation examples are described in the following numbered aspects:

Aspect 1: A method of wireless communication performed by a user equipment, comprising: transmitting a scheduling request that includes information associated with an artificial intelligence module of the user equipment; and receiving an uplink grant for a resource allocation that is based at least in part on the artificial intelligence module.

Aspect 2: The method of Aspect 1, wherein the artificial intelligence module is one of a plurality of artificial intelligence modules associated with the user equipment, and wherein the artificial intelligence module is selected by the user equipment.

Aspect 3: The method of any of Aspects 1-2, wherein the artificial intelligence module comprises a channel state information feedback encoding operation.

Aspect 4: The method of any of Aspects 1-3, wherein a size of the resource allocation or a configuration of the resource allocation is based at least in part on the information indicating the artificial intelligence module.

Aspect 5: The method of any of Aspects 1-4, wherein a phase of a transmission of the scheduling request indicates the information indicating the artificial intelligence module.

Aspect 6: The method of any of Aspects 1-5, wherein the information indicating the artificial intelligence module comprises one or more bits of the scheduling request.

Aspect 7: The method of any of Aspects 1-6, wherein the resource allocation is based at least in part on which scheduling request resource is used to transmit the scheduling request.

Aspect 8: The method of any of Aspects 1-7, wherein the scheduling request indicates the artificial intelligence module based at least in part on a scheduling request resource used to transmit the scheduling request.

Aspect 9: The method of any of Aspects 1-8, wherein the information indicating the artificial intelligence module indicates at least one of one or more weights or one or more parameters for the artificial intelligence module.

Aspect 10: The method of any of Aspects 1-9, wherein the method includes performing an artificial intelligence operation based at least in part on the artificial intelligence module; and providing information determined using the artificial intelligence module on the resource allocation.

Aspect 11: The apparatus of any of Aspects 1-10, wherein the artificial intelligence module is a preferred artificial intelligence module selected by the user equipment.

Aspect 12: A method of wireless communication performed by a base station, comprising: receiving a scheduling request that includes information associated with an artificial intelligence module of a user equipment; and transmitting, to the user equipment, an uplink grant for a resource allocation that is based at least in part on the artificial intelligence module.

Aspect 13: The method of Aspect 12, further comprising: determining a selected artificial intelligence module based at least in part on the artificial intelligence module indicated by the scheduling request; and performing an operation based at least in part on the selected artificial intelligence module.

Aspect 14: The method of any of Aspects 12-13, wherein the artificial intelligence module indicated by the scheduling request comprises a channel state information feedback encoding operation and the selected artificial intelligence module comprises a channel state information feedback decoding operation.

Aspect 15: The method of any of Aspects 12-14, wherein the artificial intelligence module is one of a plurality of artificial intelligence modules associated with the user equipment, and wherein the artificial intelligence module was selected by the user equipment.

Aspect 16: The method of any of Aspects 12-15, wherein the information indicating the artificial intelligence module indicates one or more weights or one or more parameters for the artificial intelligence module.

Aspect 17: The method of any of Aspects 12-16, further comprising receiving information determined using the artificial intelligence module on the resource allocation.

Aspect 18: The method of any of Aspects 12-17, wherein the artificial intelligence module is a preferred artificial intelligence module that was selected by the user equipment.

Aspect 19: The method of any of Aspects 12-18, wherein a size of the resource allocation or a configuration of the resource allocation is based at least in part on the information indicating the artificial intelligence module.

Aspect 20: The method of any of Aspects 12-19, wherein a phase of a transmission of the scheduling request indicates the information indicating the artificial intelligence module.

Aspect 21: The method of any of Aspects 12-20, wherein the information indicating the artificial intelligence module comprises one or more bits of the scheduling request.

Aspect 22: The method of any of Aspects 12-21, further comprising: providing information associated with the artificial intelligence module to another UE.

Aspect 23: The method of any of Aspects 12-22, wherein a size of a downlink resource allocation used to provide the information associated with the artificial intelligence module to the other UE is based at least in part on the information indicating the artificial intelligence module Aspect 24: The method of any of Aspects 12-23, wherein the scheduling request indicates the artificial intelligence module based at least in part on a scheduling request resource used to transmit the scheduling request.

Aspect 25: An apparatus for wireless communications at a UE, comprising a memory and one or more processors coupled to the memory, the memory and the one or more processors configured to perform the method of one or more aspects of Aspects 1-11.

Aspect 26: An apparatus for wireless communication, comprising at least one means for performing the method of one or more aspects of Aspects 1-11.

Aspect 27: A non-transitory computer-readable medium storing a set of instructions for wireless communication, the set of instructions comprising one or more instructions that, when executed by one or more processors of a UE, cause the device to perform the method of one or more aspects of Aspects 1-11.

Aspect 28: An apparatus for wireless communications at a base station, comprising a memory and one or more processors coupled to the memory, the memory and the one or more processors configured to perform the method of one or more aspects of Aspects 12-24.

Aspect 29: An apparatus for wireless communication, comprising at least one means for performing the method of one or more aspects of Aspects 12-24.

Aspect 30: A non-transitory computer-readable medium storing a set of instructions for wireless communication, the set of instructions comprising one or more instructions that, when executed by one or more processors of a base station, cause the base station to perform the method of one or more aspects of Aspects 12-24.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communications at a user equipment, comprising:

one or more memories; and one or more processors coupled to the one or more memories, the one or more processors configured to:

transmit a scheduling request that includes artificial intelligence information corresponding to an artificial intelligence module of the user equipment, wherein the artificial intelligence information indicates at least one of one or more weights or one or more parameters for the artificial intelligence module, wherein a scheduling request resource used to transmit the scheduling request indicates the artificial intelligence module, from a set of artificial intelligence modules; and receive an uplink grant for a resource allocation that is based at least in part on the artificial intelligence information and the artificial intelligence module, wherein a size of the resource allocation of the scheduling request resource or a configuration of the resource allocation of the scheduling request resource is in accordance with the artificial intelligence information.

2. The apparatus of claim 1, wherein the artificial intelligence module is one of a plurality of artificial intelligence modules associated with the user equipment, and wherein the artificial intelligence module is selected by the user equipment.

3. The apparatus of claim 1, wherein the artificial intelligence module comprises a channel state information feedback encoding operation.

4. The apparatus of claim 1, wherein a phase of a transmission of the scheduling request indicates the artificial intelligence information.

5. The apparatus of claim 1, wherein the artificial intelligence information comprises one or more bits of the scheduling request.

6. The apparatus of claim 1, wherein the resource allocation is based at least in part on which scheduling request resource is used to transmit the scheduling request.

7. The apparatus of claim 1, wherein the one or more processors are configured to:

perform an artificial intelligence operation based at least in part on the artificial intelligence module; and provide second information determined using the artificial intelligence module on the resource allocation.

8. The apparatus of claim 1, wherein the artificial intelligence module is a preferred artificial intelligence module selected by the user equipment.

9. An apparatus for wireless communications at a base station, comprising:

one or more memories; and one or more processors coupled to the one or more memories, the one or more processors configured to:

receive a scheduling request that includes artificial intelligence information corresponding to an artificial intelligence module of a user equipment, wherein the artificial intelligence information indicates at least one of one or more weights or one or more parameters for the artificial intelligence module, wherein a scheduling request resource used to transmit the scheduling request indicates the artificial intelligence module, from a set of artificial intelligence modules; and transmit, to the user equipment, an uplink grant for a resource allocation that is based at least in part on the artificial intelligence information and the artificial intelligence module, wherein a size of the resource allocation of the scheduling request resource or a configuration of the resource allocation of the scheduling request resource is in accordance with the artificial intelligence information.

10. The apparatus of claim 9, wherein the one or more processors are configured to:

determine a selected artificial intelligence module based at least in part on the artificial intelligence module indicated by the scheduling request; and perform an operation based at least in part on the selected artificial intelligence module.

11. The apparatus of claim 10, wherein the artificial intelligence module indicated by the scheduling request comprises a channel state information feedback encoding operation and the selected artificial intelligence module comprises a channel state information feedback decoding operation.

12. The apparatus of claim 9, wherein the artificial intelligence module is one of a plurality of artificial intelligence modules associated with the user equipment, and wherein the artificial intelligence module was selected by the user equipment.

13. The apparatus of claim 9, wherein the one or more processors are configured to:

receive second information determined using the artificial intelligence module on the resource allocation.

14. The apparatus of claim 9, wherein the artificial intelligence module is a preferred artificial intelligence module that was selected by the user equipment.

15. The apparatus of claim 9, wherein a phase of a transmission of the scheduling request indicates the artificial intelligence information.

16. The apparatus of claim 9, wherein the artificial intelligence information comprises one or more bits of the scheduling request.

17. The apparatus of claim 9, wherein the one or more processors are configured to:

provide the artificial intelligence information corresponding to the artificial intelligence module to another UE.

18. The apparatus of claim 17, wherein a size of a downlink resource allocation used to provide the artificial intelligence information corresponding to the artificial intelligence module to the other UE is based at least in part on the artificial intelligence information.

19. The apparatus of claim 9, wherein the scheduling request indicates the artificial intelligence module based at least in part on a scheduling request resource used to transmit the scheduling request.

20. A method of wireless communication performed by a user equipment, comprising:

transmitting a scheduling request that includes artificial intelligence information corresponding to an artificial intelligence module of the user equipment, wherein the artificial intelligence information indicates at least one of one or more weights or one or more parameters for the artificial intelligence module, wherein a scheduling request resource used to transmit the scheduling request indicates the artificial intelligence module, from a set of artificial intelligence modules; and receiving an uplink grant for a resource allocation that is based at least in part on the artificial intelligence information and the artificial intelligence module, wherein a size of the resource allocation of the scheduling request resource or a configuration of the resource allocation of the scheduling request resource is in accordance with the artificial intelligence information.

21. The method of claim 20, wherein the artificial intelligence module comprises a channel state information feedback encoding operation.

22. A method of wireless communication performed by a base station, comprising:

receiving a scheduling request that includes artificial intelligence information corresponding to an artificial intelligence module of a user equipment, wherein the artificial intelligence information indicates at least one of one or more weights or one or more parameters for the artificial intelligence module, wherein a scheduling request resource used to transmit the scheduling request indicates the artificial intelligence module, from a set of artificial intelligence modules; and transmitting, to the user equipment, an uplink grant for a resource allocation that is based at least in part on the artificial intelligence information and the artificial intelligence module, wherein a size of the resource allocation of the scheduling request resource or a configuration of the resource allocation of the scheduling request resource is in accordance with the artificial intelligence information.

23. The method of claim 22, further comprising:

determining a selected artificial intelligence module based at least in part on the artificial intelligence module indicated by the scheduling request; and performing an operation based at least in part on the selected artificial intelligence module.

24. The apparatus of claim 1, wherein the one or more processors are configured to:

determine the at least one of the one or more weights or the one or more parameters for the artificial intelligence module based at least in part on an encoder network.

25. The method of claim 20, further comprising:

determining the at least one of the one or more weights or the one or more parameters for the artificial intelligence module based at least in part on an encoder network.

* * * * *